United States Patent
Jaksa

(10) Patent No.: US 12,034,365 B2
(45) Date of Patent: Jul. 9, 2024

(54) SOFT-START FOR RESONANT CONVERTERS

(71) Applicant: Murata Manufacturing Co., Ltd., Nagaokakyo (JP)

(72) Inventor: Rubinic Jaksa, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 227 days.

(21) Appl. No.: 17/439,055

(22) PCT Filed: Mar. 13, 2020

(86) PCT No.: PCT/US2020/022525
§ 371 (c)(1),
(2) Date: Sep. 14, 2021

(87) PCT Pub. No.: WO2020/190673
PCT Pub. Date: Sep. 24, 2020

(65) Prior Publication Data
US 2022/0158536 A1 May 19, 2022

Related U.S. Application Data

(60) Provisional application No. 62/704,060, filed on Mar. 15, 2019.

(51) Int. Cl.
*H02M 1/36* (2007.01)
*H02M 1/00* (2006.01)
(Continued)

(52) U.S. Cl.
CPC ........... *H02M 1/36* (2013.01); *H02M 1/0058* (2021.05); *H02M 3/01* (2021.05);
(Continued)

(58) Field of Classification Search
CPC ...... H02M 3/01; H02M 1/36; H02M 3/33571; H02M 3/33573; H02M 3/33592; H02M 1/0025
See application file for complete search history.

(56) References Cited

U.S. PATENT DOCUMENTS 6,351,401 B1  2/2002  Scheel et al.
8,018,740 B2  9/2011  Sun et al.
(Continued)

FOREIGN PATENT DOCUMENTS

EP    1081839 A2    3/2001
EP    2 417 697 B1  8/2015

OTHER PUBLICATIONS

Official Communication issued in International Patent Application No. PCT/US2020/022525, mailed on Jul. 8, 2020.
(Continued)

*Primary Examiner* — Alex Torres-Rivera
(74) *Attorney, Agent, or Firm* — Keating & Bennett, LLP

(57) ABSTRACT

An LLC converter includes a switching stage including primary transistors, a resonant stage connected to the switching stage, a transformer including a primary winding connected to the resonant stage and a secondary winding coupled with the primary winding, a rectifying stage connected to the secondary winding of the transformer and providing an output voltage of the LLC converter, and a controller configured and/or programmed to, during start-up, control the output voltage by switching the primary transistors based on a first reference voltage that exponentially increases during start-up and a second reference voltage that is based on a resonant current of the resonant stage.

9 Claims, 6 Drawing Sheets

(51) Int. Cl.
  *H02M 3/00*   (2006.01)
  *H02M 3/335*  (2006.01)
  *H02M 1/42*   (2007.01)

(52) U.S. Cl.
  CPC ... *H02M 3/33571* (2021.05); *H02M 3/33573* (2021.05); *H02M 3/33592* (2013.01); *H02M 1/4208* (2013.01)

(56) References Cited

U.S. PATENT DOCUMENTS

| | | | |
|---|---|---|---|
| 9,257,913 B1 | 2/2016 | McDonald | |
| 9,318,946 B2 | 4/2016 | Feng et al. | |
| 9,812,975 B2 | 11/2017 | Chen | |
| 2011/0181262 A1* | 7/2011 | Deguchi | H02M 3/156 323/284 |
| 2013/0099787 A1 | 4/2013 | Lu et al. | |
| 2014/0091718 A1* | 4/2014 | Brinlee | H02M 3/01 363/16 |
| 2015/0124488 A1* | 5/2015 | Dai | H02M 1/36 363/17 |
| 2015/0280545 A1* | 10/2015 | Afsharian | H02M 1/08 363/21.02 |
| 2015/0318778 A1 | 11/2015 | Gong et al. | |
| 2019/0229629 A1* | 7/2019 | Halberstadt | H02M 3/33553 |

OTHER PUBLICATIONS

Fang et al., "Stability Analysis and Trigger Control of LLC Resonant Converter for a Wide Operational Range", Energies 2017, vol. 10, 1448, Sep. 21, 2017, pp. 1-21.
Feng et al., "Optimal Trajectory Control of LLC Resonant Converter for Soft Start-Up", Center for Power Electronic Systems, VTIP 12-131, Apr. 19, 2016, pp. 1-21.
Extended European Search Report in EP20774848.4, mailed Oct. 6, 2022, 7 pages.
Kurokawa et al., "Inrush Current Suppression Characteristics for HVDC Converter," 2014 IEEE 36th International Telecommunications Energy Conference (INTELEC), Sep. 28, 2014, 6 pages.
Maruta et al., "Function Switched Soft-Start Method of DC-DC Converter for Energy Management of HVDC System," 2015 IEEE 2nd International Future Energy Electronics Conference (IFEEC), Nov. 1, 2015, 5 pages.
Examination Report in EP20774848.4, mailed Jan. 5, 2024, 6 pages.

* cited by examiner

SOFT-START FOR RESONANT CONVERTERS

BACKGROUND OF THE INVENTION

1. Field of the Invention

The present invention relates to soft-start for resonant converters. More specifically, the present invention relates to soft-start for resonant converters that uses a first reference voltage that exponentially increases during start-up and a second reference voltage that is based on a resonant current of the resonant stage.

2. Description of the Related Art

FIGS. 1-3 show resonant converters that can be used with known soft-start schemes or with the soft-start schemes of the preferred embodiments of the present invention.

It is known to soft start a converter to prevent a large inrush current and a large output voltage overshoot. Some known soft-start schemes for resonant converters use a reference voltage $V_{ref}$ that is linear or that is exponential-like, where exponential-like is either exponential or approximates an exponential curve. Such known soft-start schemes may not maintain the minimum required resonant current to achieve zero-voltage switching (ZVS) during soft-start. Due to the characteristics of the LLC tank gain, there is a discrepancy between the output voltage $V_{out}$ and the reference voltage $V_{ref}$ which leads to the voltage control loop not being effective and to the minimum required resonant current not being sustained. Known soft-start algorithms can have one or more of the following issues:

1. The linear or exponential-like reference voltage $V_{ref}$ can be too slow or can be too fast, depending on the load during soft-start.
2. The output voltage $V_{out}$ curve includes regions in which the output voltage does not rise significantly in the frequency range where the resonant tank gain does not increase significantly.
3. The switching frequency changes slowly because of the type of reference voltage $V_{ref}$, because of saturation of the voltage controller, or because of narrow loop bandwidth.
4. The resonant current can experience very low levels, which causes the main power switches, e.g., switches $Q_1$, $Q_2$ in FIGS. 1 and 2 and switches $Q_1$, $Q_2$, $Q_3$, $Q_4$ in FIG. 3, to hard-switch, i.e., switch with a non-zero voltage.

The tank gain of the converter is non-linear over a switching frequency range. Because the tank gain at lower frequencies can be lower than at higher frequencies, the resonant current may drop to a very low level during soft-start, which can lead to loss of ZVS.

Sun et al. (U.S. Pat. No. 8,081,740) teaches operating an LLC resonant converter in a fixed-frequency and variable-pulse duty cycle operation mode during startup of the LLC resonant converter. Sun et al.'s soft-start scheme can effectively limit the inrush current, but both the high-side and low-side switches are operated with a variable pulse duty cycle. One of the drawbacks of Sun et al.'s soft-start scheme is that its implementation using commercially available LLC control integrated circuits (ICs) is difficult. Most of the commercially available LLC control ICs do not provide a variable pulse duty cycle function. To achieve this function, a complicated external control circuit needs to be added, while considering the isolation requirement for the high-side switch. Another important drawback of Sun et al.'s soft-start scheme is the loss of soft-switching during start-up which requires special considerations for gate drive design.

Feng et al., Center for Power Electronic Systems, "Optimal Trajectory Control of Resonant LLC Converter for Soft Start-Up," discloses another soft-start scheme. This soft-start scheme uses an asymmetrical current limitation band to settle the initial voltage and current levels. Because a startup current in Feng et al. is controlled within the asymmetrical current limitation band, no inrush current exists during startup. Accordingly, one of the drawbacks of Feng et al.'s control scheme is that a resonant current and resonant capacitor voltage measurement circuits are needed to implement the asymmetrical current limitation band, which increases the overall cost of a system that includes Feng et al.'s control scheme. Another drawback of Feng et al.'s control scheme is that the control scheme may be difficult, if not impossible, to implement using a fixed-point microcontroller.

SUMMARY OF THE INVENTION

To overcome the problems described above, preferred embodiments of the present invention provide a soft-start scheme for resonant converters in which a reference voltage $V_{ref}$ is modified in regions of an output voltage $V_{out}$ curve where a resonant current of the resonant converter is below a current required for proper ZVS operation of the switches in the resonant converter. The soft-start scheme is applicable to any type of LLC resonant converter, such as a half bridge converter with a single resonant capacitor, a split capacitor and a full bridge converter, presented in FIGS. 1-3 respectively.

According to a preferred embodiment of the present invention, an LLC converter includes a switching stage including primary transistors, a resonant stage connected to the switching stage, a transformer including a primary winding connected to the resonant stage and a secondary winding coupled with the primary winding, a rectifying stage connected to the secondary winding of the transformer and providing an output voltage of the LLC converter, and a controller to control the output voltage during start-up by switching the primary transistors based on a first reference voltage that exponentially increases during start-up and a second reference voltage that is based on a resonant current of the resonant stage.

The primary transistors preferably are switched with zero-voltage switching. The controller preferably adds the first reference voltage and the second reference voltage. The second reference voltage is preferably zero unless an average resonant current is below a threshold current. The second reference voltage is preferably limited to be between zero and a third of a maximum reference voltage.

The primary switches are preferably arranged in either a half-bridge or a full-bridge configuration. The resonant stage preferably includes a split resonant capacitor.

The resonant stage preferably includes a resonant capacitor and a resonant inductor. The rectifying stage preferably includes synchronous rectifiers connected to the secondary winding.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
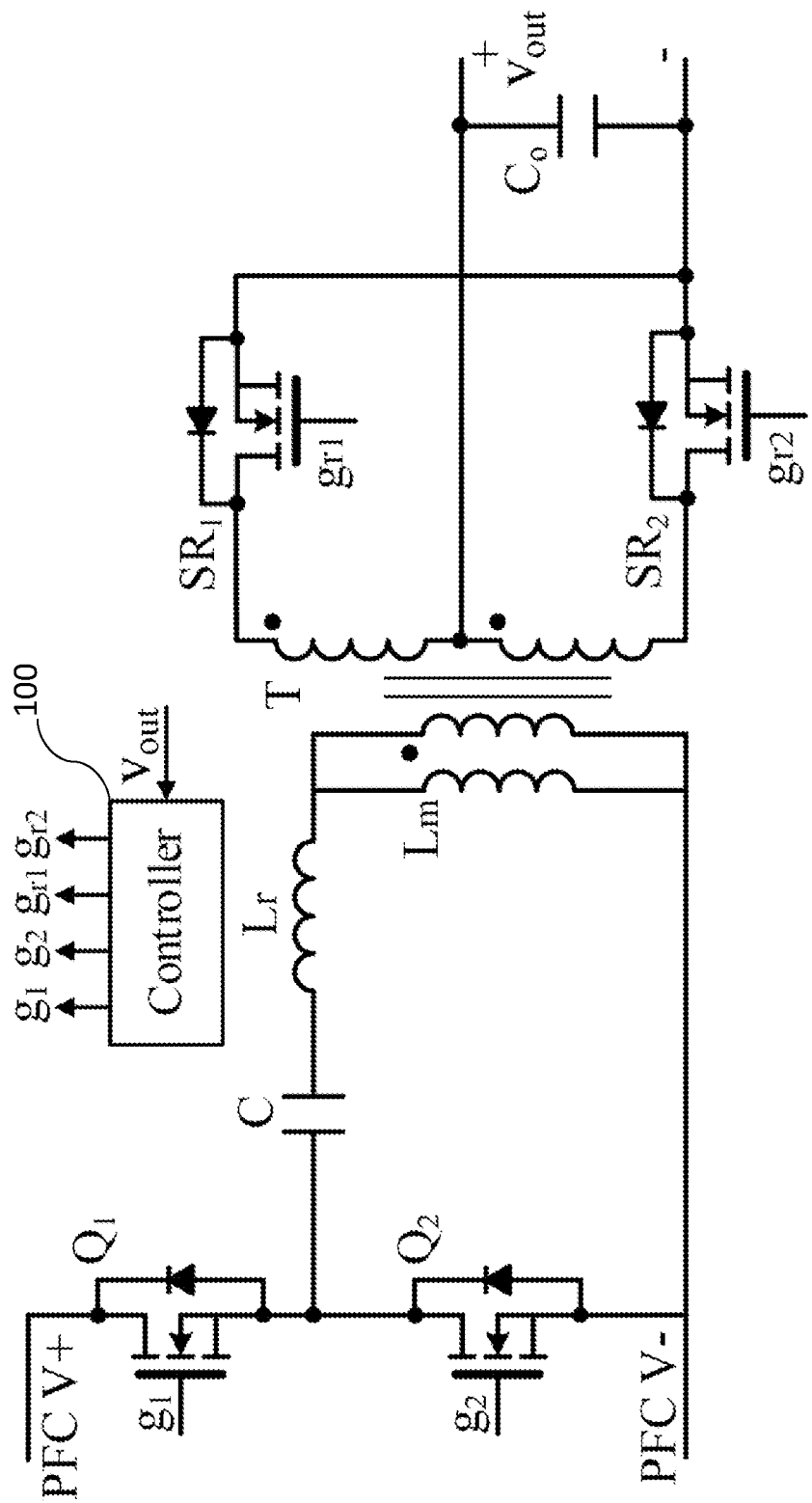
FIG. 1 is a circuit diagram of a half-bridge LLC converter with a single resonant capacitor.

FIG. 1 shows a half-bridge LLC converter with a single resonant capacitor C. This converter includes a primary side and a secondary side. The primary side is the side of the converter located between the terminals PFC V+, PFC V− and the transformer T. The secondary side is the side of the converter located between the transformer T and the output terminals +, −. A PFC stage (not shown) provides a DC input to the converter at terminals PFC V+, PFC V−.

The primary circuit includes primary switches $Q_1$, $Q_2$, resonant inductor $L_r$, resonant capacitor C, and inductor $L_m$. The primary switches $Q_1$, $Q_2$ define a switching stage and are connected in series across the terminals PFC V+, PFC V−. The resonant inductor $L_r$, resonant capacitor C, and inductor $L_m$ define a resonant stage. The resonant inductor $L_r$ and the resonant capacitor C are connected in series with each other and are connected between the primary windings of the transformer T and a node between the primary switches $Q_1$, $Q_2$. Inductor $L_m$ is connected in parallel across the primary windings of the transformer T. The secondary circuit includes synchronous rectifiers $SR_1$, $SR_2$, output capacitor $C_o$, and output terminals +, −. The transformer T includes two secondary windings. The synchronous rectifiers $SR_1$, $SR_2$ define a rectifying stage and are connected to the secondary windings of the transformer T. The output capacitor $C_o$ is connected to a node between the two secondary windings and the output terminal +. A controller 100 can be used to synchronize and control switching of the respective gates $g_1$, $g_2$, $g_{r1}$, and $g_{r2}$ of switches $Q_1$, $Q_2$ and synchronous rectifiers $SR_1$, $SR_2$. The above described components are typical of LLC converters, including those shown in FIGS. 2 and 3.

Figure 2:
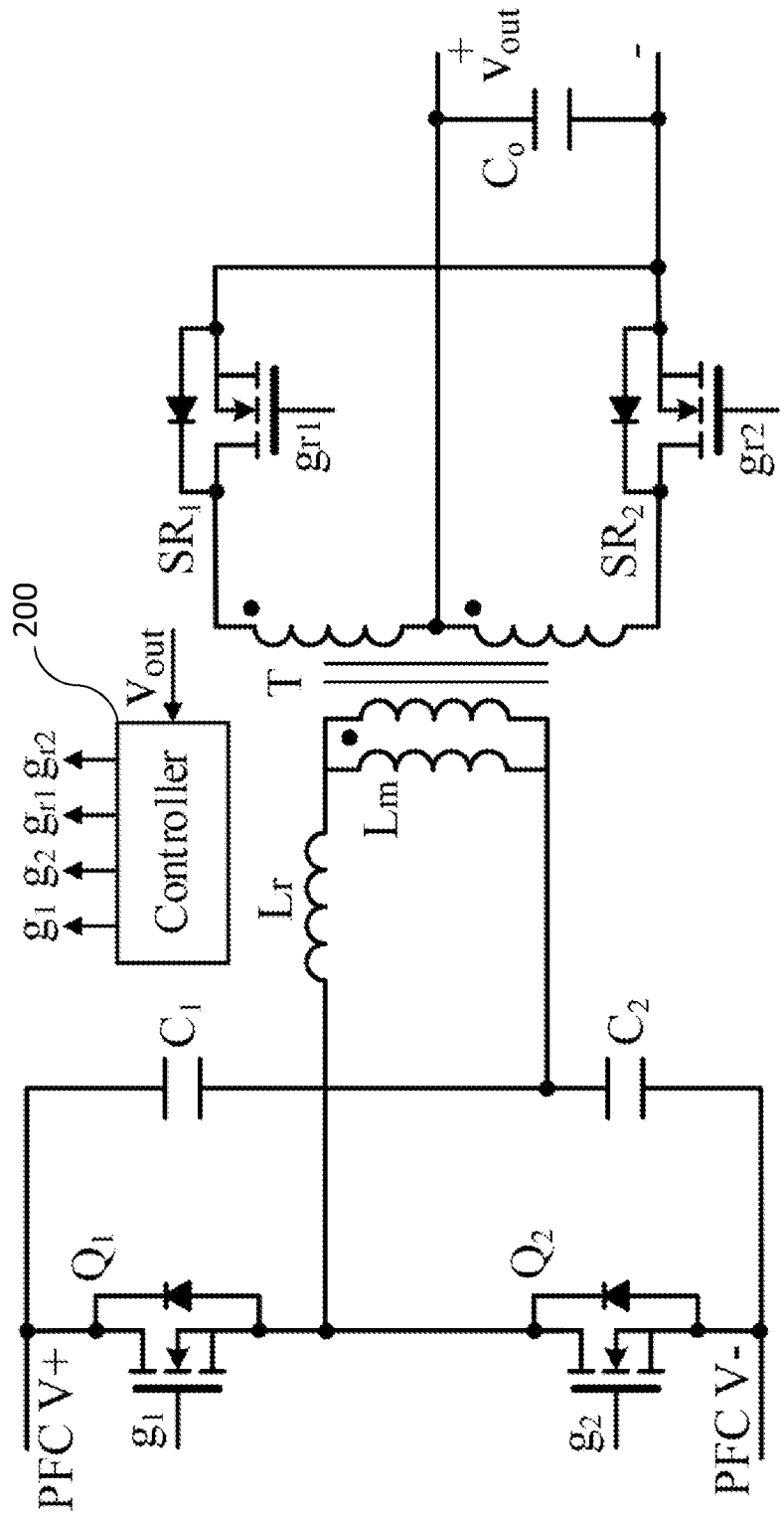
FIG. 2 is a circuit diagram of a half-bridge LLC converter with a split resonant capacitor.

FIG. 2 shows a half-bridge LLC converter with split resonant capacitors $C_1$, $C_2$. The converter shown in FIG. 2 is similar to the converter shown in FIG. 1 except that the resonant capacitor C is split into resonant capacitors $C_1$, $C_2$. The resonant capacitors are connected in series with each other and connected in parallel with the terminals PFC V+, PFC V−. The node between the capacitors $C_1$, $C_2$ is connected to the primary winding of the transformer T. As in the LLC circuit of FIG. 1, a controller 200 can be used to synchronize and control switching of the respective gates $g_1$, $g_2$, $g_{r1}$, and $g_{r2}$ of switches $Q_1$, $Q_2$ and synchronous rectifiers $SR_1$, $SR_2$.

Figure 3:
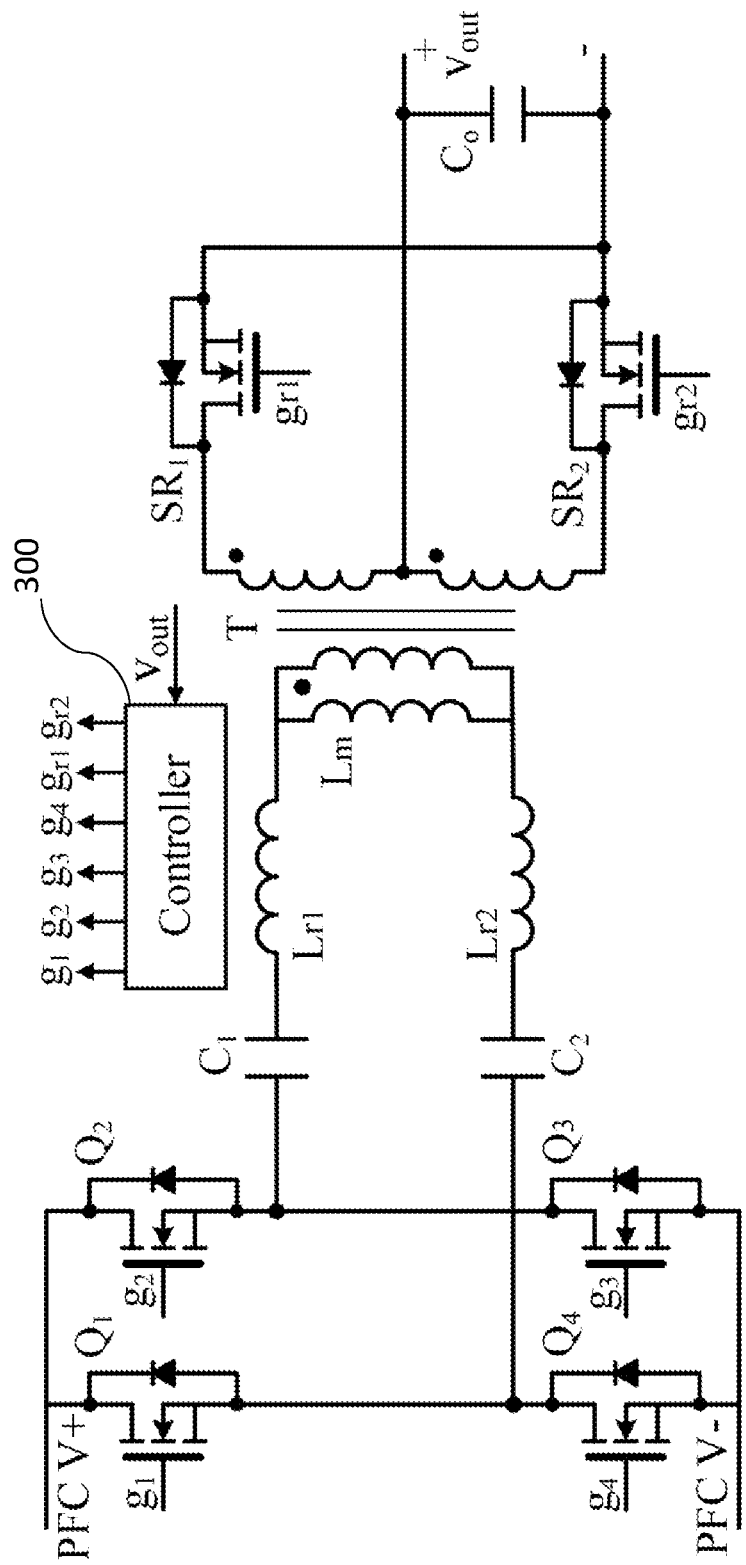
FIG. 3 is a circuit diagram of a full-bridge LLC converter.

FIG. 3 shows a full-bridge LLC converter. The converter shown in FIG. 3 is similar to the converters shown in FIGS. 1 and 2 but includes a full-bridge instead of a half-bridge. The primary circuit includes primary switches $Q_1$, $Q_2$, $Q_3$, $Q_4$, resonant inductors $L_{r1}$, $L_{r2}$, resonant capacitors $C_1$, $C_2$, and inductor $L_m$. The primary switches $Q_1$, $Q_2$, $Q_3$, $Q_4$ define a switching stage and are connected in a full bridge and are connected to the terminals PFC V+, PFC V−. The resonant inductor $L_{r1}$ and the resonant capacitor $C_1$ are connected in series with each other and are connected between the primary windings of the transformer T and a node between the primary switches $Q_2$, $Q_4$. The resonant inductor $L_{r2}$ and the resonant capacitor $C_2$ are connected in series with each other and are connected between the primary windings of the transformer T and a node between the primary switches $Q_1$, $Q_3$. Inductor $L_m$ is connected in parallel across the primary windings of the transformer T. A controller 300 can be used to synchronize and control switching of the respective gates $g_1$, $g_2$, $g_3$, $g_4$, $g_{r1}$, and $g_{r2}$ of switches $Q_1$, $Q_2$ and synchronous rectifiers $SR_1$, $SR_2$.

The primary switches $Q_1$, $Q_2$, $Q_3$, $Q_4$ and the synchronous rectifiers $SR_1$, $SR_2$ in FIGS. 1-3 can be metal-oxide-semiconductor field-effect transistors (MOSFETs), but other suitable transistors can also be used. The primary switches $Q_1$, $Q_2$, $Q_3$, $Q_4$ and the synchronous rectifiers $SR_1$, $SR_2$ can be switched on and off by a controller 100, 200, 300. The controller 100, 200, 300 can switch on and off the primary switches $Q_1$, $Q_2$, $Q_3$, $Q_4$ and the synchronous rectifiers $SR_1$, $SR_2$ based on the output voltage. The controller 100, 200, 300 can be implemented using one or more digital microcontrollers, which can be programmed and/or configured to implement the transient control method discussed below. The controller 100, 200, 300 can be any type of digital processor regardless of the architecture, including, but not limited, to the digital signal processor (DSP), programmable intelligent computer (PIC), field-programmable gate array (FPGA), AVR microcontroller, etc. The transient control method can be executed at any arbitrary speed with a custom sampling rate depending on the converter's switching frequency. The controller's 100, 200, 300 gain and reference can be adjusted in any way to fit the design and to provide a stable control loop. The controller 100, 200, 300 can be placed on either the primary side or the secondary side. Isolation between the primary and secondary sides can be maintained by transmitting signals across the isolation boundary using an isolator, including, for example, a digital isolator or an opto-isolator such as an opto-coupler.

Figure 4:
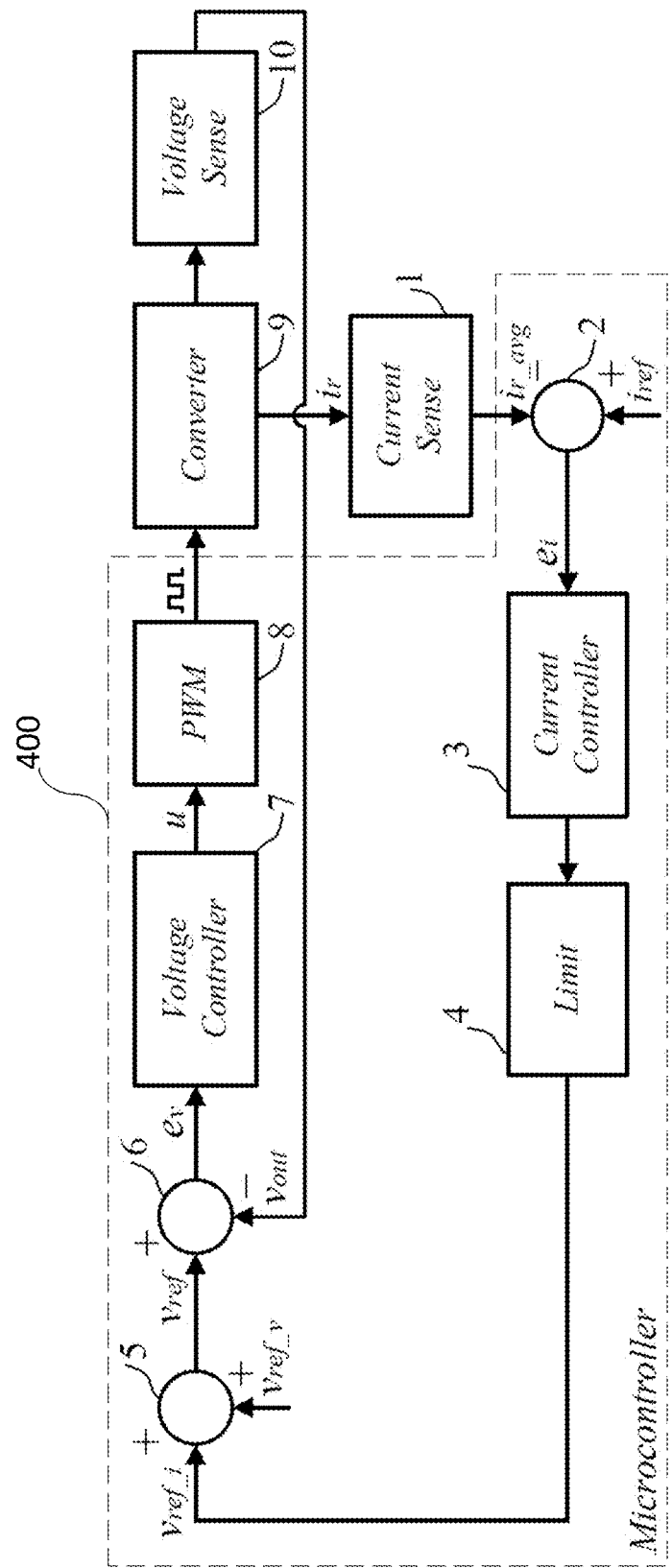
FIG. 4 is a control block diagram of a full-bridge LLC converter with closed-loop control.

The soft-start scheme of FIG. 4 can provide an output voltage $V_{out}$ curve that resembles an exponential rise with a smooth approach to the set-point. To ensure that this soft-start scheme compensates for the significant non-linearity of the resonant tank, the soft-soft scheme uses a control correction in the form of current control loop to help maintain the minimum resonant current level for ZVS, which works by increasing the reference voltage $V_{ref}$ when needed.

The soft-start scheme shown in FIG. 4 uses current control to modify the reference voltage $V_{ref}$ in the regions of the output voltage $V_{out}$ curve where the resonant current is below the required current for proper ZVS operation. The soft-start scheme can be used with any type of LLC resonant converter, such as a half bridge converter with a single resonant capacitor, a split capacitor and a full bridge converter, as shown, for example, in FIGS. 1-3, respectively.

The soft-start scheme shown in FIG. 4 can be implemented in a digital microprocessor 400, including functions within the dotted line box. The functional blocks within the microcontroller 400 in FIG. 4 should be understood to be digital representations and not actual physical structures within the microcontroller 400. It is possible to implement the soft-start scheme using discrete components instead or in addition to the microcontroller 400. To address insufficient resonant current to sustain ZVS operation during soft-start, a current control loop is added to the voltage control loop. The current control loop operates in parallel with the voltage control loop and can increase the reference voltage $v_{ref\_v}$. Both the voltage control loop and the current control loop can be implemented as proportional/integral controllers or any other suitable controllers.

Current sensor 1 measures the resonant current of the converter 9. Current sensor 1 can be an analog current sensor that outputs signal $i_{r\_avg}$ representing the average value of the resonant current $i_r$. Signal $i_{r\_avg}$ is sampled by the microcontroller 400 and then subtracted from the current reference $i_{ref}$ in the summation block 2. The current reference $i_{ref}$ is the current reference for current loop and is a fixed digital number. The current reference $i_{ref}$ is the minimum average value of the resonant current required to maintain ZVS operation under light load conditions during soft-start of the converter 9. Summation block 2 provides current error signal $e_i$ that is fed to the current controller 3. Current controller 3 outputs reference voltage $v_{ref\_i}$, which represents the output of the current control loop. The limiter 4 has zero as its low saturation point and one third of the maximum value of reference voltage $v_{ref\_v}$ as its high saturation point. The purpose of limiting the output of the current controller 2 to only positive numbers is to prevent the current controller 3 from decreasing the reference voltage $v_{ref\_v}$ and subsequently decreasing resonant current.

Reference voltage $v_{ref\_v}$ can be a voltage reference digitally generated inside the microcontroller and defines the output voltage waveform for soft-start operation of the converter 9. The summation block 5 adds the reference voltage $v_{ref\_i}$ to the reference voltage $v_{ref\_v}$ to generate reference voltage $v_{ref}$. Both reference voltages $v_{ref\_i}$ and $v_{ref\_v}$ are always positive. Thus, reference voltage $v_{ref}$ can only be positive.

Voltage sensor 10 senses the output voltage $V_{out}$ of the converter 9. Voltage sensor 10 can be an analog voltage sensor. The output of voltage sensor 10 is sampled and digitized by the microcontroller 400 to determine a digital value of the signal $v_{out}$. Summation block 6 subtracts signal $v_{out}$ from the reference voltage $v_{ref}$ to provide the error signal $e_v$. The error signal $e_v$ is input into the voltage controller 7, which can be a digital voltage controller. The voltage controller 7 outputs the control signal u to the PWM 8 to form gate pulses for the switching transistors of the converter 9.

As shown in FIG. 4, the current loop does not control the load current. The current control loop is only engaged when a critically low resonant current level is detected. During light-load soft-start operation and when the current controller is engaged, the additional resonant tank energy generated by the current control loop leads to a smaller output-voltage rise time and ultimately leads to the converter 9 reaching the set-point faster. However, during heavy-load soft-start operation, the resonant current is much higher than the current reference $i_{ref}$ threshold. The current controller's 3 output remains at zero because the limiter 4 does not allow negative output values, thus soft-start operation is not affected by the current control loop.

After soft-start operation has ended and the output voltage $V_{out}$ has reached its nominal voltage, the current controller 3 is disconnected and does not affect the voltage control loop. Thus, this soft-start scheme does not disturb or cause any abrupt output voltage or resonant current changes. Furthermore, the computational load on the microcontroller 400 is insignificantly increased only during soft-start.

Figure 5:
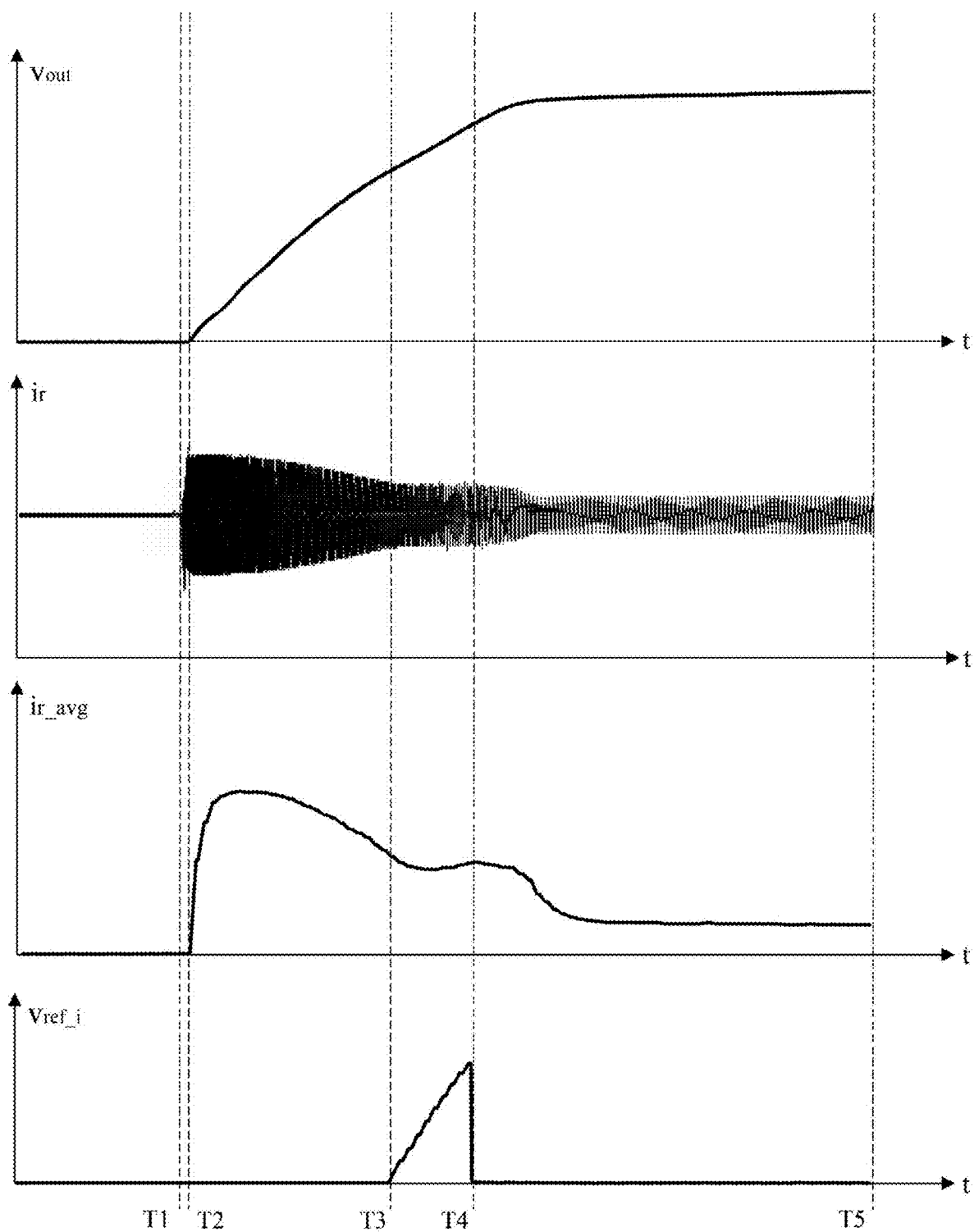
FIG. 5 shows soft-start waveforms of a converter at 10% load.
Figure 6:
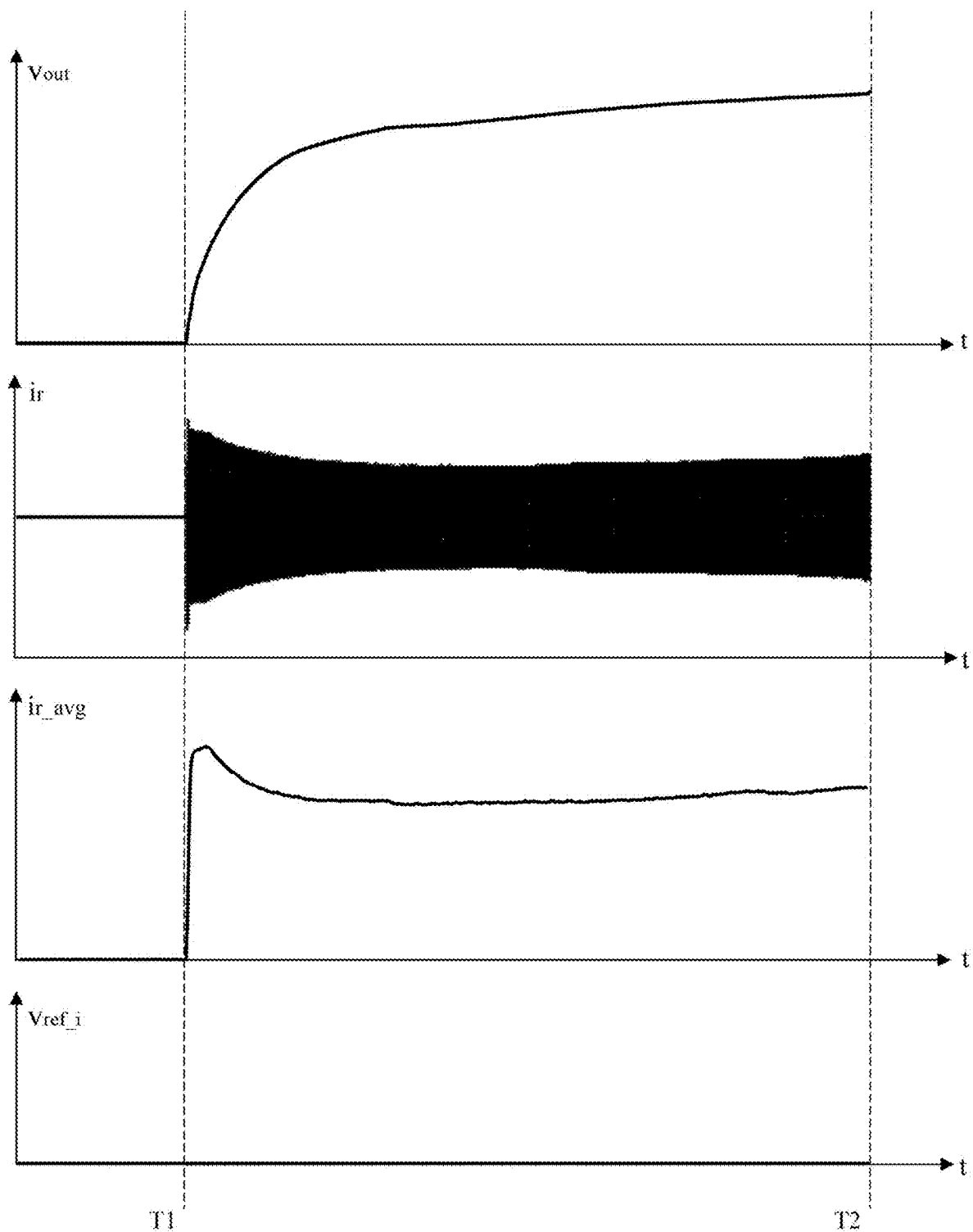
FIG. 6 shows soft-start waveforms of a converter at 60% load.

FIGS. 5 and 6 shows various waveforms during light-load and heavy-load soft start. Light-load can be, for example, 10% of maximum load, and heavy-load can be 60% of maximum load.

In FIG. 5, at time T1, the converter begins soft-start operation. The initial switching frequency of the switches is 3.5 times higher than resonant frequency to ensure that the inrush current to the resonant tank is within reasonable levels. At time T2, enough active power is transferred to the secondary side of the converter to cause the output voltage $V_{out}$ to rise slowly from zero. From time T2 to time T3, the switching frequency is reduced by the voltage controller 7, which causes the resonant tank to operate at increased gain, which results in the output voltage $V_{out}$ rises further. From time T1 to time T5, the resonant current $i_r$ decreases from a larger initial value at time T1 to the value that matches the load requirements when soft-start is completed at time T5. Due to this resonant current decrease, at time T3, the average value of the resonant current $i_{r\_avg}$ reaches a critically low level. Because the converter at this time is still operating at a switching frequency 2.2 times higher than resonant frequency, the converter will lose ZVS operation of the primary switches if the resonant current decreases further. To prevent loss of ZVS operation, the current control loop increases the reference voltage $v_{ref\_i}$, which is added to the reference voltage $v_{ref\_v}$, as shown in FIG. 4. The voltage control loop responds to increased reference voltage $v_{ref}$ by lowering the switching frequency at a faster rate. This lower of the switching frequency increases the resonant current. A slight change in output voltage $V_{out}$ slope is also noticeable. Both higher resonant current value and lower switching frequency help sustain ZVS operation. At time T4, the switching frequency is only 1.5 times higher than resonant frequency, which is considered safe for ZVS operation, regardless of the value of the resonant current $i_r$. Therefore, at time T4, the current controller is disconnected, and the reference voltage $v_{ref\_i}$ drops to zero. From time T4 to time T5, the output voltage $V_{out}$ slowly approaches the set-point. At time T5, the output voltage $V_{out}$ is equal to the reference voltage $v_{ref\_v}$; soft-start operation is completed; and the converter enters steady-state operation.

In FIG. 6 with heavy-load soft-start, the value of resonant current is above the current reference $i_{ref}$ threshold for the entire duration of soft-start. This guarantees ZVS operation. Therefore, the current control output is zero during heavy-load soft-start.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. An LLC converter comprising:
   a switching stage including primary transistors;
   a resonant stage connected to the switching stage;
   a transformer including:
      a primary winding connected to the resonant stage; and
      a secondary winding coupled with the primary winding;
   a rectifying stage connected to the secondary winding of the transformer and providing an output voltage of the LLC converter; and
   a controller to control the output voltage during start-up by switching the primary transistors based on a first reference voltage that exponentially increases during start-up and a second reference voltage that is based on a resonant current of the resonant stage.

2. The LLC converter of claim 1, wherein the primary transistors are switched with zero-voltage switching.

3. The LLC converter of claim 1, wherein the controller adds the first reference voltage and the second reference voltage.

4. The LLC converter of claim 1, wherein the second reference voltage is zero unless an average resonant current is below a threshold current.

5. The LLC converter of claim 1, wherein the second reference voltage is limited to be between zero and a third of a maximum reference voltage.

6. The LLC converter of claim 1, wherein the primary switches are arranged in either a half-bridge or a full-bridge configuration.

7. The LLC converter of claim 6, wherein the resonant stage includes a split resonant capacitor.

8. The LLC converter of claim 1, wherein the resonant stage includes a resonant capacitor and a resonant inductor.

9. The LLC converter of claim 1, wherein the rectifying stage includes synchronous rectifiers connected to the secondary winding.

\* \* \* \* \*